Patented Mar. 16, 1943

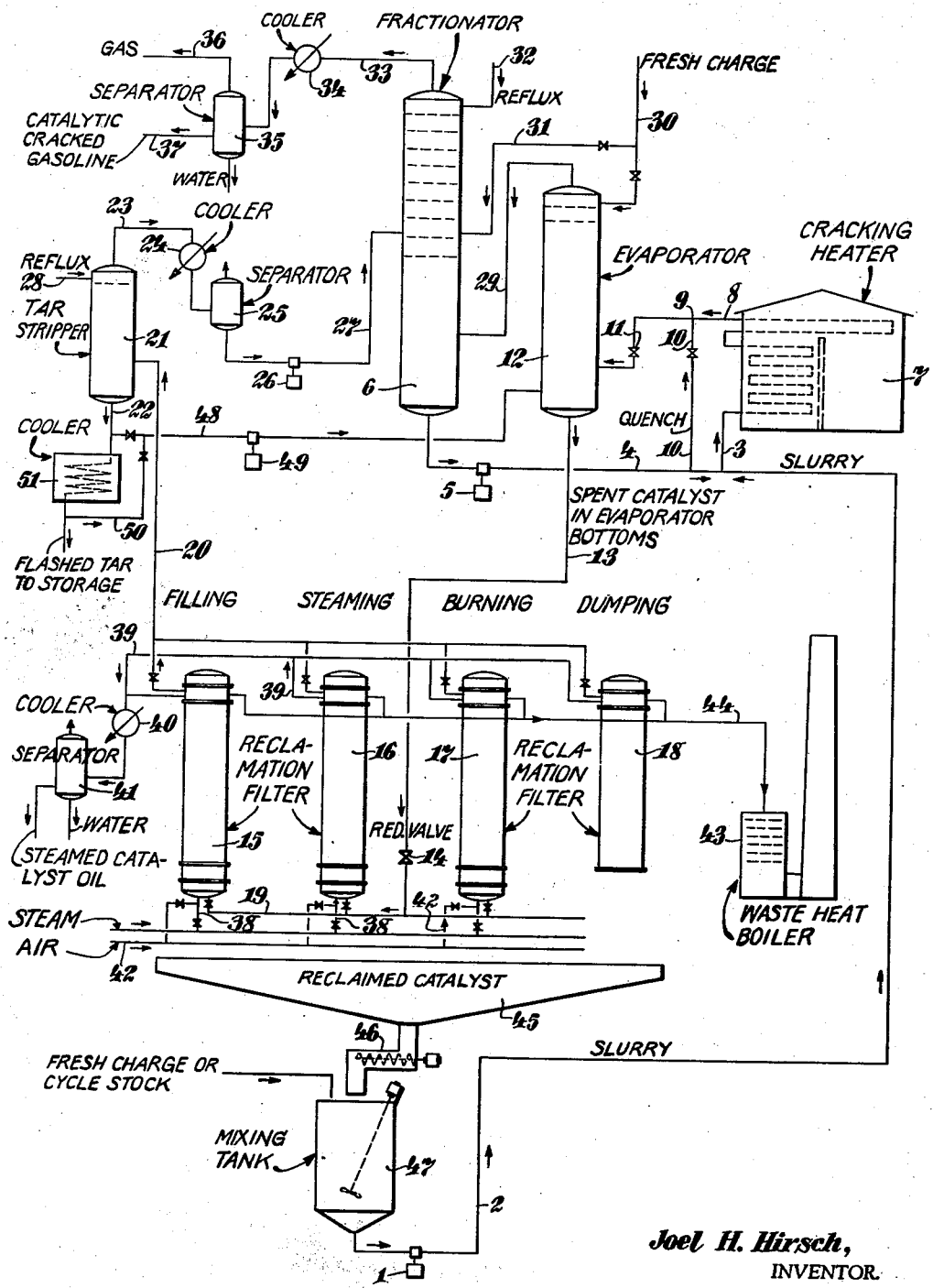

2,313,940

UNITED STATES PATENT OFFICE 2,313,940

CATALYTIC CRACKING AND RECLAMATION OF CATALYSTS

Joel H. Hirsch, Wichita, Kans., assignor to The Vickers Petroleum Co. of Delaware, Wichita, Kans., a corporation of Delaware Application January 14, 1941, Serial No. 374,317

1 Claim. (Cl. 196—52)

The invention herein disclosed relates to the catalytic cracking of heavier hydrocarbons into lighter hydrocarbons of the gasoline range, the catalytic reforming of naphthas in the gasoline range to enhance their anti-knock properties and to the reclamation of the catalyst employed.

In brief, the invention comprises removing the spent catalyst from the cracking system in a residual oil carrier, depositing it in a chamber having a heat resistant filter element, returning the filtered carrier oil to gather more spent catalyst and subsequently steaming the excess oil and burning the carbonaceous bodies off the catalyst in an atmosphere of air and steam, so controlled as to prevent devitalizing the catalyst.

Objects of the invention are to accomplish the foregoing in a thoroughly practical and efficient way.

Further objects are to carry out the operations as a continuous process; to regenerate in a way to maintain or even improve the activity of the clay or other catalyst; to maintain desired control over such essential phases of the system as degree of concentration of spent catalyst in the oil being removed from the cracking zone and to obtain increase in the yield of high octane gasoline with less undesirable fuel oil and coke production.

Other purposes of the invention will appear as the specification proceeds.

The drawing accompanying and forming part of the specification is a flow sheet diagram of one embodiment of the invention.

Structural parts and steps in the process may be modified and changed as regards this particular disclosure, all within the true intent and broad scope of the invention as hereinafter defined and claimed.

In the continuous operation system illustrated, a slurry of the catalyst is forced by pump 1, through pipeline 2, to the heater inlet 3, where it mixes with oil in the line 4, supplied by pump 5, from the bottom of the fractionator 6.

Cracking of such oil in the presence of the catalyst is effected in the heater 7. The cracked effluent and catalyst passing out at 8, are quenched at 9, by fractionator bottoms from the valved branch line 10, and pass through the pressure reducing valve 11, into the evaporator 12.

Spent catalyst passes out of the cracking system with the bottoms from the evaporator by way of piping 13, through reduction valve 14, into a special reclamation filter.

Four such filters are shown, 15, 16, 17 and 18, for the purpose of illustrating the four phases of the complete cycle, that is, filling, steaming, burning and dumping, though ordinarily only two such filters may be required for a continuous system.

The reclamation filters may be of the type employed in conventional pressure filtration operations, such as the "Kelly" filter. Further a continuous rotary filter, such as a modification of the Oliver filter is within the scope of the invention. Such modified form of continuous filters enables the carrying out of the four phases of the reclamation cycle with only one filter, the filling, steaming, burning and dumping being effected successively as the filter element revolves.

One of the essentials is that such filter or filters be capable of withstanding temperatures of revivification. For such purpose, the leaves of the filter may be covered with a filter cloth, such as stainless steel, glass or asbestos cloth.

In the illustration, filter 15 is the one in service, the catalyst in the evaporator bottoms passing through piping 13, 19, up through the bottom of filter 15.

The filtration is carried out hot so that filtrate passing out at the top of filter 15, through line 20, into a tar stripper 21, is largely vaporized.

Material unsuitable for further cracking is separated in the tar stripper by fractional condensation therein and removed from the bottom at 22 through a cooler 51, this operation being controlled by reflux admitted to the top of the tar stripper at 28. The tar stripper overhead is shown passing off at 23, through a cooler 24, and separator 25, and forced by pump 26 through line 27, as an intermediate reflux to the fractionator 6.

A portion of the tar, after filtering and flashing, is returned as flux to the bottom of the evaporator, providing the medium for controlled removal of spent catalyst from the cracking system. This is accomplished by means of a valved line 48, from the bottom of the tar stripper 21, to the bottom of the evaporator 12, including a pump 49, and a valved branch line 50, from the discharge side of the cooler 51, into line 48. By this construction either hot or cooled tar, or a mixture of hot and cooled tar, may be recycled to the evaporator, as the particular cracking operation may require. The tar flux stream serves a purpose quite different from that of the fractionator bottoms quench through 4—10, which serves primarily as a cooling medium to prevent coking at the heater back pressure valve.

By proper adjustment of the tar flux rate at pump 49, it is possible to vary the spent catalyst concentration of the evaporator bottoms from the maximum that the oil will carry, for instance, on the order of 100 to 150 lbs. per bbl. down to very low concentrations. The desirability for such control may be appreciated by considering for example that at a concentration of 50 lbs. of catalyst per bbl. of fresh charge and a tar production of 20 percent, the spent catalyst concentration of the tar would then be 250 lbs. per bbl. and so high that some of the catalyst would probably settle out in the bottom of the evaporator or in line 13.

The gas, gasoline and uncracked gas oil pass overhead through 29, from the evaporator 12 to the fractionator 6.

Fresh charge is admitted through lines 30 and 31 to the evaporator and fractionator, respectively. The character of the oil recycled in the cracking process may be controlled by admitting a portion of the fresh charge through line 30 as reflux to the top of the evaporator, excess fresh charge over that required for evaporator reflux being admitted through line 31 as intermediate reflux to the fractionator. The boiling range of the catalytic cracked gasoline from the process is controlled by reflux to the top of the fractionator at 32.

From the fractionator, gas and gasoline pass overhead through line 33 and cooler 34, to a gas separator 35.

From separator 35 the gas is passed off through line 36, to a gas absorber and the catalytic cracked gasoline is taken off at 37, to a stabilizer.

A pressure gage on the inlet line may be used to indicate the rate and extent of filling of the reclamation filter. When full, as shown by such gage or other indicating means, the filter in service, such as 15, in the illustration, is cut out and subjected to the steaming step represented at 16, the evaporator bottoms containing the catalyst being at the time switched over into a fresh filter. The invention contemplates and includes reclaiming the catalyst continuously.

By the use of superheated steam supplied at 38, the last traces of oil are recovered from the catalyst held in the filter, now represented at 16, such oil passing off at the top at 39, through cooler 40, and separator 41, where the water is taken out. This oil may be passed off to a slop tank for subsequent cracking or other processing.

After recovery of oil from the catalyst, air supplied through piping 42, is cut in with the steam as indicated at the filter at 17, to burn the carbonaceous material off and out of the catalyst.

The proportions of air and steam are preferably so controlled that temperature during the burning operation will be maintained between 800° F. and 1000° F. at pressures from slightly above atmospheric to 100 lbs. per square inch. It has been found that the entire burning step can be effected at temperatures as low as 850° F. With temperatures as low as this, fusing of the catalyst, which would render it inert for further use is prevented. In the oil recovery stage of the operation represented at 16, the steaming is continued with superheated steam until the steam condensate is found to be substantially free from oil. During this operation the temperature is maintained at slightly above 800° F., as shown by thermocouples in the filter. After all recoverable oil has been steamed off the catalyst, a small amount of air is admitted with the steam. With admission of air the temperature in the filter rises sharply, and the proportions of air and steam are then adjusted to control the rate and extent of the temperature rise. With this means of control the temperature during burning is kept within definite predetermined limits. The preferred operation is to control the air-steam mixture so that the maximum temperature reached during the burning operation is between 900° F. and 950° F., although it is believed that maximum temperatures as high as 1050° F. could be used without harm to the catalyst, and satisfactory regeneration has been achieved without exceeding a maximum temperature of 850° F. As the temperature rise begins to fall off, the proportion of air is increased until finally all of the steam is cut off and only pure air is being admitted to the filter. The burning operation is continued with air alone passing through the filter until the temperature has fallen well below 800° F., indicating that all of the carbonaceous material has been burned off of the catalyst. Although steam has been customarily used with the air as a diluent during the burning operation, it will be understood that any inert gas, such as recirculated flue gas would be equally effective for this purpose.

By following the progress of the burning with a combustion gas analyzer, it has been found that during the entire regeneration step substantial quantities of carbon monoxide are present in the exit gas. With excess air always present, this is clear evidence of the low temperature maintained in the burning operation, the ignition temperature of carbon monoxide being 1191° F.-1216° F. At the end of the burning operation, when regeneration is completed, the carbon dioxide content of the exit gas has fallen to a very low value, say 0.2–0.4 percent.

The heat of the hot combustion gases may be recovered in a waste heat boiler or other suitable heat recovery equipment, such as indicated at 43, through the medium of waste heat flue connections 44, extending from the filter 17, in which burning is being effected.

After the burning operation, the filter is dumped, as indicated at 18, the regenerated catalyst dropping in this case into a trough or hopper 45, from which it may be discharged by screw conveyor 46, vibration feed or the like, to the slurry mixing tank 47.

The reactivated catalyst and the fresh charge or cycle stock which make up the slurry may be supplied at constant rates to the mix tank, more or less to match the constant rate at which the slurry may be withdrawn and charged to the cracking zone.

Different catalysts may be used. A treated adsorbent clay powder such as "Super Filtrol" bleaching clay has been found satisfactory.

Extensive tests have shown that the reclamation operation disclosed will convert a clay of this type which has become completely spent in the catalytic cracking stage to one more active than the fresh clay. This has been established by tests, of which the following example is typical:

To three 75 cc. portions of light oil of −1 Saybolt color, contained in four ounce bottles, were added five grams of fresh Filtrol, reclaimed Filtrol, and spent Filtrol, respectively. The bottles were all shaken vigorously, allowed to stand for 20 minutes and filtered. The filtrate from treatment with fresh Filtrol had a color of +13 Saybolt, while that from the reclaimed Filtrol was +16 Saybolt, and that from spent Filtrol was darker than −16 Saybolt.

This phase of the invention therefore makes it possible to save and utilize color spent clays which have been used in the contact treating of lubricating oils and which heretofore have been discarded.

The reclamation procedure of this invention may have important uses in thermal cracking processes. Using the equipment described the quality of fuel oil from thermal cracking can be greatly improved by filtering out finely divided carbon particles, and subsequently removing these particles from the filter by burning. Past attempts to lower the sediment content of cracked fuel oil by filtration have been handicapped by the difficulty of cleaning the filter. The tar coated carbon particles constitute a sticky mass which greatly complicates the cleaning. Burning, in the filter, as in this invention, provides a cheap effective method of removing carbon from the filter and makes it possible to produce premium quality fuel oil at low cost. The invention contemplates and includes such treatment.

As one example of operations, spent "Filtrol" from a previous catalytic cracking run, reclaimed as here disclosed was then again employed in a run on 39° A. P. I. light virgin gas oil and operating on a once through basis without returning fractionator bottoms to the cracking process at a catalyst concentration of about 25 lbs. reclaimed Filtrol per barrel of fresh charge and with a reaction temperature of approximately 915° F. and pressure of 200 lbs. per square inch, a once through yield of approximately 32 volume percent gasoline was obtained having an octane number of 74.5 A. S. T. M. method.

The octane number of the gasoline obtained from this catalytic cracking with reclaimed Filtrol was slightly higher than that obtained with similar processing using fresh Filtrol. Under similar conditions of treatment, without clay, the octane number obtained was only about 68.

In a similar run made with spent Filtrol without the reclamation, very little, if any octane improvement was shown over a run made without any clay. This new reclamation operation therefore serves to convert a material otherwise useless from either a cracking or decolorizing standpoint into one having qualities equal and even superior to the fresh catalyst.

The once through operations with virgin stock show highly favorable results, but it is believed that the most favorable catalytic cracking operations are obtained on a recycling basis, such as shown.

As an example of catalytic cracking on cycle stocks, a highly refractory cycle stock from a thermal cracking unit, having a gravity of 24.8° A. P. I. and A. S. T. M. 50% point of 478° F. gave a once through yield of about 20 percent gasoline having an octane number more than four points higher than the best obtained on virgin gas oil. Moreover, the filtered bottoms were found to be more paraffinic than those obtained from cracking without the catalyst, indicating that the clay had removed a portion of the tarry matter thus making the bottoms more suitable for recracking than those obtained without the clay.

In other instances, light virgin gas oil similar to that used in once through runs has been recycled to completion. In such cases, the bottoms containing the clay were filtered and returned complete to the cracking process, no fuel oil being withdrawn, the only products eliminated being gas, catalytic cracked gasoline and the tarry bodies adsorbed on the clay and to be subsequently removed in the burning operation. In a run of considerable length without removing any bottoms from the system no operating difficulties were experienced and the filtered bottoms though darker toward the end of the run were not nearly as tarry as they would have been without the presence of the clay. And it is probable that a run of such length could not have been obtained at all without the clay or without withdrawing some bottoms to cut down the coking tendencies of the recycle stock. Moreover, even though the bottoms filtered from the clay toward the end of the run were fairly dark, the overhead from distilling these bottoms to dryness had excellent color, indicating that a recycling catalytic cracking operation could be operated on a continuous basis by withdrawing only a small amount of tar. The octane number of the gasoline obtained from such run was equal to that obtained on a once through basis on this stock, but the yield of catalytic cracked gasoline per unit of catalyst was about twice that obtained in the once through runs.

One of the advantages which this invention possesses over thermal cracking processes lies in the ability of the clay to selectively adsorb and remove a substantial proportion of the tarry bodies, which are at the point of incipient coking. In a residuum type thermal process it is necessary to withdraw a relatively large volume of oil which might otherwise be subjected to further cracking, in order to provide a carrier medium for removing the tarry bodies from the cracking system. The selectivity of the clay also constitutes an important improvement over thermal coking or "non-residuum" type operation, which because of its inability to select only the deleterious components must inadvertently convert to coke some materials not requiring removal from the cracking system. By this feature of the invention, the gasoline yield from a cracking process is appreciably increased and the production of undesirable fuel oil and coke, correspondingly reduced. The possibility of increased gasoline yield, through selective removal of tarry bodies, may be of equal or greater economic importance than the higher octane number of the gasoline made possible by this invention.

What is claimed is:

The herein disclosed process of catalytically cracking hydrocarbon oils, which comprises forming a slurry of finely divided solid cracking catalyst, mixing said slurry with the oil to be cracked and passing the mixture so formed, with the finely divided cracking catalyst in intimate contact with the oil, through a confined elongated heating and cracking zone heated to catalytic cracking temperatures, separating the heated mixture into a vapor portion free of catalyst and a residual liquid containing the spent catalyst, removing the residual liquid containing the catalyst from the separating zone, hot filtering the spent catalyst out of the residual hot liquid, regenerating the accumulated catalyst in the filtration zone, returning the regenerated catalyst from the filtration zone to the slurry, thereby recycling it back to the catalytic cracking zone, flashing the hot filtrate to vaporize cycle stock and to leave a hot liquid residue of cracked fuel oil and returning a portion of the hot liquid residue to the separating zone to augment the volume of residual liquid carrying the spent catalyst from the separating zone.

JOEL H. HIRSCH.